Dec. 27, 1938.  G. F. COLLEY  2,142,069
GUARD OR SHIELD FOR VEHICLES
Filed June 19, 1937   2 Sheets-Sheet 1
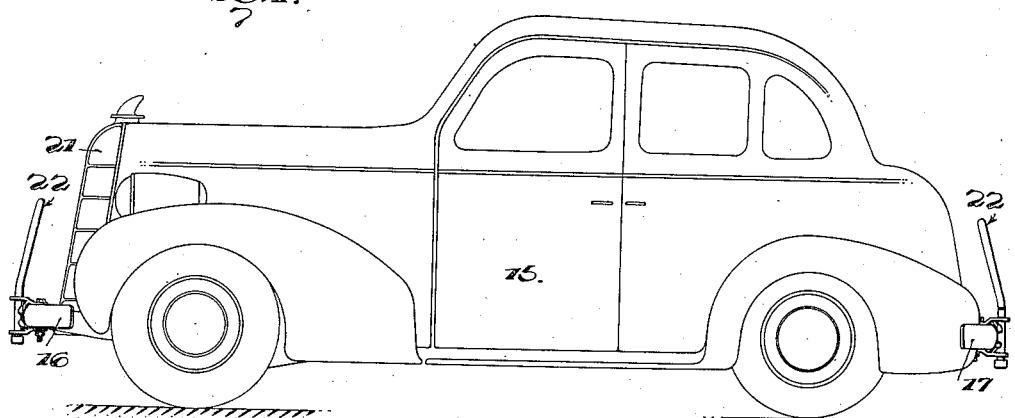
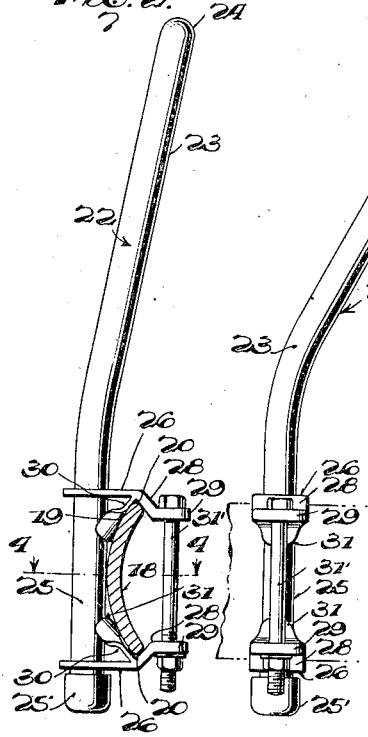
Inventor
George F. Colley.
By
Attorney Dec. 27, 1938. G. F. COLLEY 2,142,069
GUARD OR SHIELD FOR VEHICLES
Filed June 19, 1937 2 Sheets-Sheet 2

Inventor
George F. Colley.
By
Attorney

Patented Dec. 27, 1938

2,142,069

UNITED STATES PATENT OFFICE 2,142,069

GUARD OR SHIELD FOR VEHICLES

George F. Colley, Jacksonville, Fla., assignor to Merchants and Manufacturers Inc., Jacksonville, Fla., a corporation of Florida Application June 19, 1937, Serial No. 149,226

4 Claims. (Cl. 293—55)

My invention relates to a guard or shield for vehicles.

An important object of the invention is to provide a guard or shield, to be mounted upon the usual bumper of an automobile, to adequately protect the radiator shell.

A further object of the invention is to provide a guard or shield to be arranged at the rear of the automobile, and mounted upon the bumper to protect the rear end or trunk of the automobile.

A further object of the invention is to provide simple and reliable means for attaching the guard or shield to the bumper, whereby the guard or shield cannot be separated from the bumper, without a substantial destruction of the parts.

A further object of the invention is to provide means for attaching the guard or shield to the bumper, and constructed to have a wedging action with the bumper so that it may be mounted upon bumpers of different sizes and designs.

A further object of the invention is to provide attaching means of the above mentioned character which will exert a clamping action upon the guard or shield to hold the same against vertical displacement.

A further object of the invention is to provide attaching means to mount the guard or shield upon the front or outer side of the bumper.

A further object of the invention is to provide a guard or shield which is simple in construction, cheap to manufacture, convenient to install upon the automobile, and reliable in operation.

Figure 6:
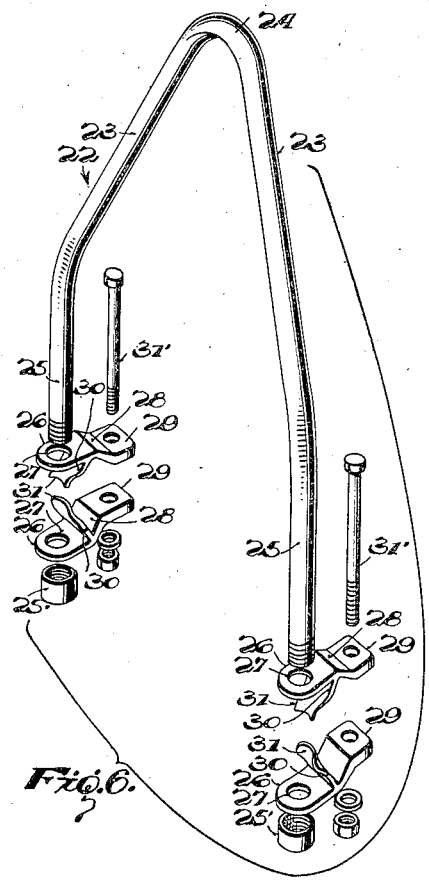
Figure 7:
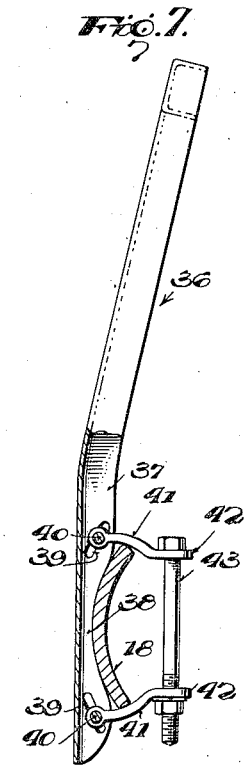
Figure 9:
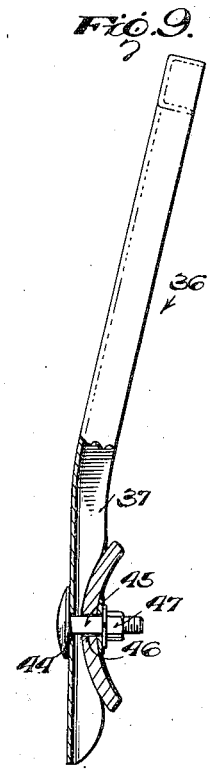
Figure 8:
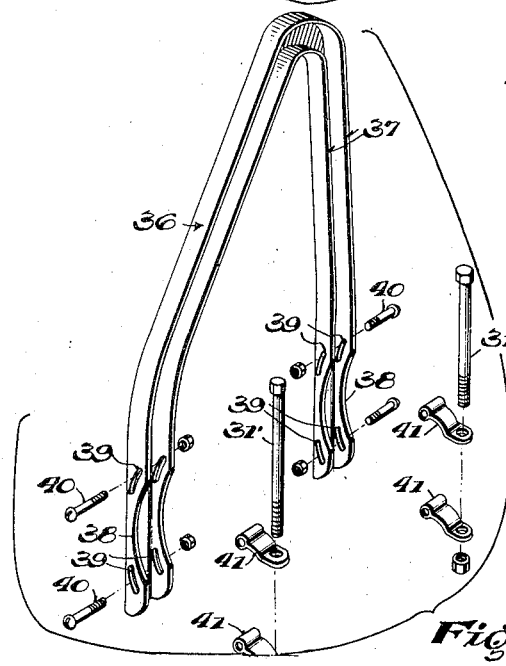
Figures 10, 11:
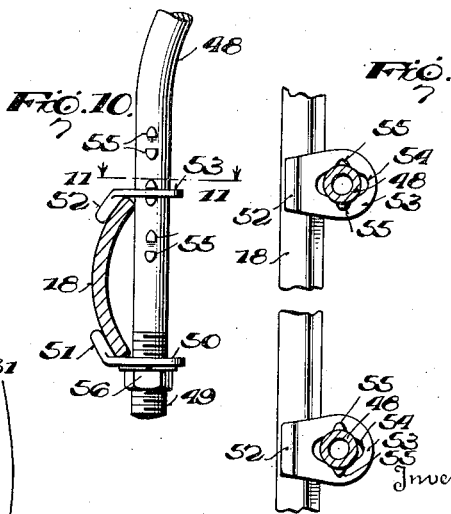

In the accompanying drawings forming a part of this application and in which like numerals are employed to designate like parts throughout the same, Figure 1 is a side elevation of an automobile, showing the shields or guards embodying my invention, applied to the front and rear bumpers, Figure 2 is an edge elevation of the front guard or shield, the bumper being in section, Figure 3 is a side elevation of the front guard or shield, Figure 4 is a horizontal section taken on line 4—4 of Figure 2, Figure 5 is an edge elevation of the rear guard or shield, Figure 5a is a horizontal section taken on line 5a—5a of Figure 5, Figure 6 is an exploded perspective view of the front guard or shield and associated elements, Figure 7 is an edge elevation of a guard or shield embodying a modified form of the invention, Figure 8 is an exploded perspective view of the modified form of guard or shield and associated elements, shown in Figure 7, Figure 9 is an edge elevation of a further modified form of guard or shield, Figure 10 is a side elevation, parts broken away, of a further modified form of guard or shield, and, Figure 11 is a horizontal section taken on line 11—11 of Figure 10.

Attention being called first to Figures 1, 2, 3 and 6, the numeral 15 designates an automobile of any well known or preferred type having a front bumper 16 and a rear bumper 17. Bumpers 16 and 17 may be of the same construction and are shown as comprising horizontally arranged bumper-bars 18. The bumper-bars 18 are shown as curved in cross section, affording an outer inclined or convex face 19, and edges 20. While I have shown and described my guard or shield as applied to a bumper of the type shown and described, it is to be understood that the invention is not restricted to the use of my guard or shield with this particular type of bumper, as it may be applied to bumpers of different constructions and shapes. The bumper-bars 18 are mounted upon the front and rear of the automobile, in the usual manner. The automobile includes a radiator shell 21, which projects forwardly beyond the radiator, and this shell is frequently bent or damaged by minor accidents, which the usual front bumper does not prevent.

I provide an inverted generally V-shaped guard or shield, designated as a whole by the numeral 22, and comprising upstanding arms 23, converging upwardly for connection by an intermediate portion 24. The lower end portions 25 of the arms 23, are straight and substantially vertical. The guard or shield 22 is preferably formed in a unitary construction and is preferably tubular, although it may be made solid if desired. The lower extremities of the portions 25 are screw-threaded to receive caps 25' which may be removed, when desired. The arms 23 not only converge but are also preferably inclined rearwardly, to produce a stream-lined effect in keeping with the contour of the radiator shell. The guard or shield is mounted upon the bumper 16 and is disposed upon the front or outer side of the bumper.

Means are provided to attach the guard or shield to the bumper 16, comprising a pair of clamps. Each clamp comprises a pair of opposed straps or leaves 26, having openings 27, to slidably receive the vertical portion 25 of the guard or shield. The straps or leaves have inclined intermediate portions 28, carrying horizontal apertured knuckles 29. Fixedly attached to the straps or leaves 26 are inclined leaves 30, secured thereto by welding or the like or the same may be made integral therewith, if desired. The leaves 30 have end portions 31, curved in horizontal cross-section, to receive the straight portion 25 of the guard or shield, with which they engage, Figure 4. The leaves 30 are preferably somewhat slighter than the leaves 26 and are more resilient. The inclined leaves 30 and the inclined portions 28 form tapered or V-shaped sockets, tapering outwardly, and arranged in opposed relation, to receive the edges 20 of the bumper-bar. The bumper or guard, and leaves 30 are disposed upon the forward or outer side of the bumper-bar, while the end portions 28 and apertured knuckles 29 are disposed upon the rear or inner side of the same. The apertured knuckles 29 are connected by a bolt 31', as shown.

In view of the foregoing description it will be seen that each end portion 25 of the guard or shield is clamped to the bumper-bar. By tightening up the bolt 31', the V-shaped sockets including the elements 28 and 30 are brought into clamping engagement with the edges 20 of the bumper-bar 18. By virtue of the V-shaped sockets, the clamp may be applied to bumper-bars of different sizes and shapes, and this is particularly true since the straps or leaves 26 are longitudinally adjustable upon the straight ends 25. When the bolts 31 are screwed up, as explained, the edges of the bumper-bar 18 engaging within the V-shaped sockets, press against the leaves 30 and also clamp them laterally against the ends 25 of the guard or shield, thereby clamping the guard or shield to the clamps, against vertical displacement. As shown in Figure 1, the guard or shield 22 extends above the bumper-bar 18 for a substantial distance, affording adequate protection to the radiator shell, and preventing bumper-bars from interlocking by one passing over the other.

In Figures 1, 5 and 5a, I have shown the rear bumper-bar. In this rear bumper guard, the arms 23 are transversely cut at 32, providing the lower portions 25ª, corresponding to the lower portions 25, and these lower portions 25ª are secured to the rear bumper-bar 17 by the same clamp as described in connection with the front bumper guard or shield. The arms 23 carry extension rods 33, rigidly attached thereto and adapted to be removably inserted into the tubular portions 25ª. The rods 33 are equipped with spring pressed ball-catches 34 to removably engage within recesses 35. It is thus seen that the upper portion of the guard or bumper may be removed from the lower portions 25ª, which is done when it is desired to have access to the trunk of the automobile.

In Figures 7 and 8, I have shown a further modified form of guard or shield, designated as a whole by the numeral 36. This guard or shield is inverted generally V-shaped and is in the form of a channel, having sides or flanges 37, which are provided near their lower ends with recesses 38, to engage the outer or front convex first of the bumper-bar 18. The flanges 37 are provided near the recesses 38 and above and below the same with inclined slightly curved slots 39, receiving bolts or pivot elements 40, carrying leaves or jaws 41, pivoted thereon. These leaves or jaws carry apertured knuckles 42, connected by bolts 43, as shown.

In this form of the invention, the guard or shield is arranged upon the front or outer side of the bumper-bar, which engages within the recesses 38. The jaws or leaves 41 may be adjusted toward or from each other as is required by the width of the bumper-bar, since the bolts 40 are movable within the elongated slots 39. The bolts 43 are passed through the apertured knuckles 42 and when they are screwed up, they clamp the jaws against the edges 20 of the bumper-bar. The jaws or leaves 41 tend to turn upon these edges and hence clamp the flanges 37 of the guard or shield to the bumper-bar.

In Figure 9, the same guard or shield as shown in Figures 7 and 8 is provided, except that the slots 39 are omitted, and different attaching means is used. The guard or shield is provided near its lower end with transverse openings 44 to receive bolts 45 passing through openings 46 in the bumper-bar, and these bolts carry nuts 47, as shown. All other parts of the guard or shield remain identical with that shown and described in Figures 7 and 8.

In Figures 10 and 11, I have shown a further modified form of guard or shield, which is similar to the guard or shield shown in Figures 1 and 2. The guard or shield shown in Figures 10 and 11 is designated by the numeral 48 and is inverted generally V-shaped and has its lower ends screw-threaded, as shown at 49. In this form of the invention, the guard or shield is applied to the inner side of the bumper-bar 18. The numeral 50 designates a strap or leaf, having a circular opening to receive the end of the guard or shield, but having no screw-threaded engagement therewith. The strap 50 has an upturned jaw 51, which is curved, as shown. 52 designates a jaw, which is curved to engage the outer side of the bumper-bar and arranged opposite the jaw 51. The jaw 52 is carried by a strap or leaf 53, having an elongated opening 54, for coaction with pairs of stop-lugs 55, formed upon the sides of the guard or shield. By turning the strap or leaf 53 so that the longitudinal axis of the opening 54 is parallel with the lugs 55, these lugs will pass through the ends of the opening 54, subsequently to which the strap or leaf will then be turned at a right angle to the lugs 55 and will be locked by the pairs of lugs 55. By this means the upper straps or leaves may be adjusted longitudinally upon the sides of the guard or shield, and then held in the adjusted position. The final clamping action of the jaws 51 and 52 upon the bumper-bar 18 is effected by nuts 56, engaging the screw-threaded ends 49, as shown.

It is to be understood that the forms of my invention herewith shown and described are to be taken as preferred examples of the same and that various changes in the shape, size, and arrangement of parts may be resorted to without departing from the spirit of my invention or the scope of the subjoined claims.

Having thus described my invention, I claim:

1. A guard or shield to be mounted upon a bumper-bar, opposed clamping elements carried by the guard or shield, the clamping elements embodying tapered sockets to receive the edges of the bumper-bar, the tapered sockets including yielding elements to engage with the guard or shield, and means to draw the clamping elements together.

2. A guard or shield to be mounted upon a bumper-bar, clamping elements carried by the guard or shield and embodying wedging sockets to receive the edges of the bumper-bar, corresponding sides of the wedging sockets embodying yielding leaves for clamping engagement with the guard or shield, and means to draw the clamping elements together.

3. An inverted generally V-shaped guard or shield formed of a channel having spaced flanges, the flanges having recesses to receive the outer side of the bumper-bar, the flanges having elongated slots near the recesses and above and below the same, pivot elements adjustably mounted within the elongated slots, jaws carried by the pivot elements to engage the bumper-bars, and means to draw the jaws together.

4. A guard or shield to be mounted upon a bumper-bar and having spaced pairs of lugs, a leaf having an elongated opening for receiving guard or shield and for coacting with the lugs and having a jaw, a coacting leaf having an opening to receive the guard or shield and having a jaw, the jaws being arranged in opposed relation, and a nut having screw-threaded engagement with the guard or shield and engaging the last named leaf.

GEORGE F. X COLLEY.
his   mark

Witnesses to mark:
B. P. FISHBURNE,
JAMES H. MARR.